United States Patent
Ciesielka

(10) Patent No.: US 7,341,240 B2
(45) Date of Patent: *Mar. 11, 2008

(54) VALVE

(75) Inventor: Sean V. Ciesielka, Belvidere, IL (US)

(73) Assignee: Illinois Tool Works Inc, Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/391,046

(22) Filed: Mar. 28, 2006

(65) Prior Publication Data

US 2006/0163518 A1 Jul. 27, 2006

(51) Int. Cl.
*F16K 31/00* (2006.01)

(52) U.S. Cl. .................. 251/345; 251/352; 251/353

(58) Field of Classification Search ........... 251/148, 251/343, 344, 346, 351, 352, 353, 345; 137/797
See application file for complete search history.

(56) References Cited

U.S. PATENT DOCUMENTS

| | | | |
|---|---|---|---|
| 5,092,363 A * | 3/1992 | Vanderjagt | 137/614.02 |
| 5,096,158 A | 3/1992 | Burdick et al. | |
| 5,213,137 A * | 5/1993 | Pettesch | 137/797 |
| 5,332,194 A * | 7/1994 | Austin et al. | 251/345 |
| 5,411,115 A | 5/1995 | Shropshire | |
| 5,782,455 A * | 7/1998 | Burnworth | 251/345 |
| 6,032,705 A | 3/2000 | Murphy et al. | |
| D473,935 S | 4/2003 | Braun | |
| 6,565,095 B2 | 5/2003 | Meacham | |
| 6,622,988 B2 | 9/2003 | Gill | |
| 6,886,808 B2 * | 5/2005 | Sarno | 251/353 |
| 7,114,703 B2 * | 10/2006 | Ciesielka | 251/344 |

* cited by examiner

*Primary Examiner*—John K. Fristoe, Jr.
(74) *Attorney, Agent, or Firm*—Mark W. Croll; Paul F. Donovan

(57) ABSTRACT

A drain valve to be used with numerous drain applications, such as draining fluid from an engine, includes in an exemplary embodiment a valve body, a first and second o-ring and a valve sleeve. The drain valve eliminates the need for a tool, such as a wrench, to drain the fluid from the engine, for example. The drain valve includes a twist-and-pull valve sleeve feature to manipulate the valve; however, the valve sleeve remains on the drain valve and therefore cannot be lost or misplaced. The valve sleeve further includes an easy grip for opening and closing the valve. The drain valve may include a notch formed on the valve body to serve as a break-away point to permit the valve to break under certain conditions.

20 Claims, 12 Drawing Sheets

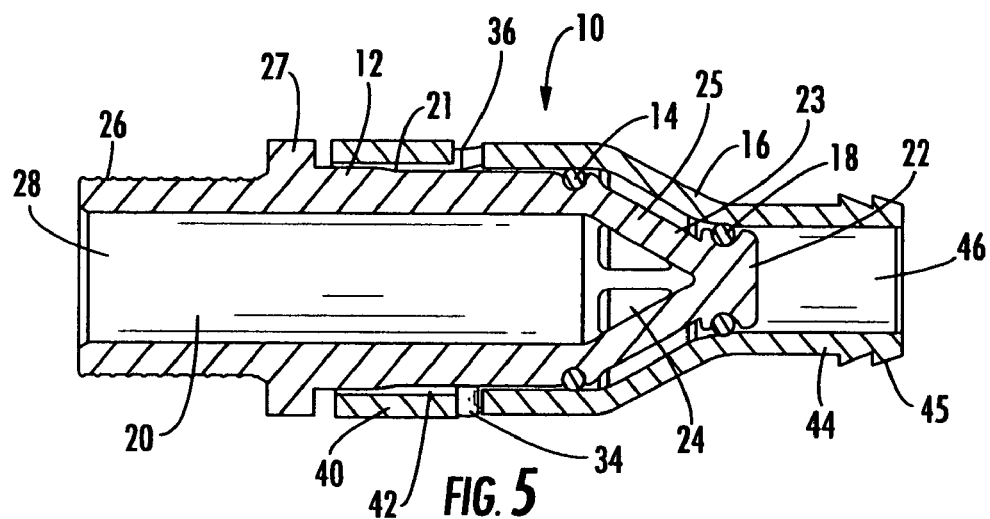
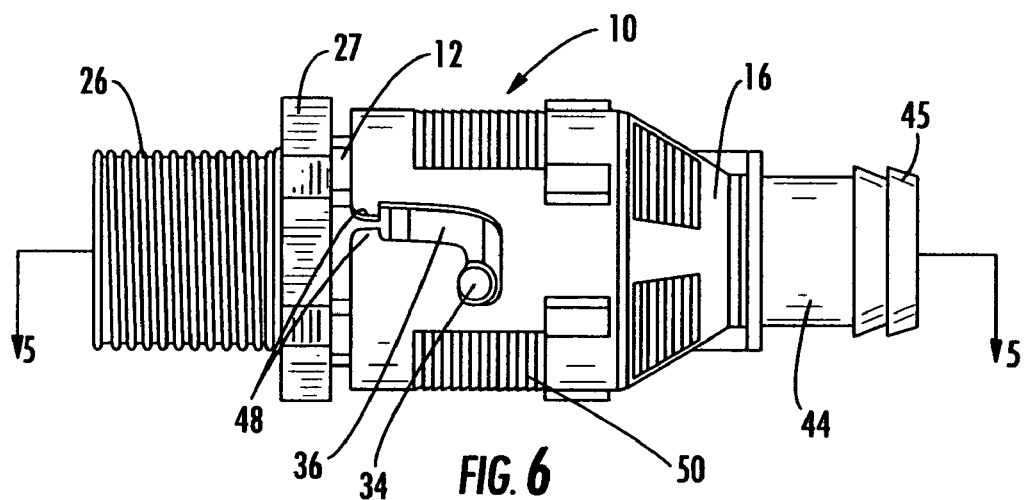

VALVE

CROSS REFERENCE TO RELATED APPLICATION

This Application claims benefit to U.S. application Ser. No. 11/093,860 filed Mar. 30, 2005, now U.S. Pat. No. 7,114,703 and claims benefit to U.S. Provisional Application Ser. No. 60/591,831 filed Jul. 28, 2004.

FIELD OF THE INVENTION

The present invention relates generally to a valve, and more particularly to a drain valve for a small gas engine.

BACKGROUND OF THE INVENTION

It is known that drain plugs are installed on small engines typically below the oil sump of the engine and are used as a removable plug to permit the fluid in the sump to be drained and replaced. The known plugs typically include at one end a threaded portion that mates with a threaded opening in the oil sump. At the opposite end, the known plugs include a tool interface, such as a hexagonal shaped head, that may be manipulated through the use of a tool, such as a wrench, to install and remove the plug.

The known drain plugs, however, have several drawbacks. For example, the conventional drain plugs must be removed from the oil sump before the oil will drain. A tool must be used to remove the plug. As a loose item, the removed plug may become lost or misplaced. Occasionally, during the replacement of the plug, the mating threads are not properly aligned creating binding of the threads, an improper seal between the plug and the oil sump, or possibly stripping of the threads. Other drawbacks and disadvantages exist with respect to known drain plugs that are overcome by the present invention.

SUMMARY OF THE INVENTION

The present invention is directed to a drain valve that is a simplified assembly over the prior art and that may be used in numerous applications, including small gas engines. The drain valve of the invention includes generally a valve body, a pair of o-rings, and a valve sleeve. The disclosed drain valve eliminates the need for a tool, such as a wrench, to drain the fluid from the engine. The drain valve further includes a twist-and-pull valve sleeve feature to manipulate the valve. The valve sleeve remains on the valve and therefore cannot be lost or misplaced. Moreover, the drain valve provides an easy grip for opening and closing the valve.

Other features and advantages of the invention will become apparent to those skilled in the art upon review of the following detailed description, claims and drawings in which like numerals are used to designate like features.

BRIEF DESCRIPTION OF THE DRAWINGS

FIG. 5 is a cross-section view of the drain valve of FIG. 6 taken at line 5-5 and illustrating the drain valve in a closed valve position.

FIG. 6 is a side view of the drain valve of the invention, illustrating the drain valve in a closed valve position.

Figure 1:
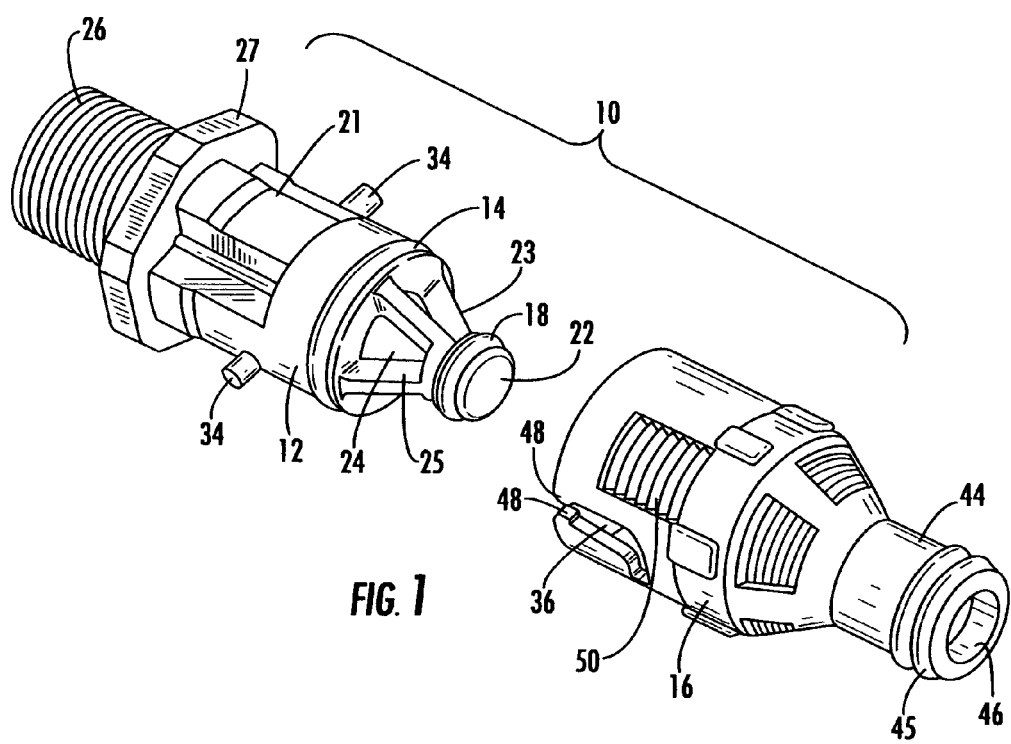
FIG. 1 is an isometric exploded view of an exemplary drain valve of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Referring to the figures there are depicted exemplary embodiments of a drain valve of the present invention. Referring to FIGS. 1-8, there is illustrated an exemplary drain valve 10 for use with an engine, such as small gasoline engine. One skilled in the art will appreciate that the teachings of the present invention may be used with numerous other drain applications in addition to the exemplary applications described herein.

In one embodiment, the exemplary drain valve 10 is a simplified assembly over the prior art and generally is a four piece assembly that includes a valve body 12, a first o-ring 14, a valve sleeve 16, and a second o-ring 18. As illustrated by FIGS. 1-4, the valve body 12 is generally cylindrical in shape and defines an interior cylindrical passageway 20 extending the length of the body. The valve body 12 also defines a first end 22 having a plurality of openings or windows 24 and a second opposing threaded end 26 also having an opening 28. The threaded end 26 is sized to mate with a threaded opening in the engine sump or crankcase, not shown. Positioned on the exterior of the valve body 12 between the first end 22 and the second end 26 is a hexagonal shaped head 27 or valve install/removal member used to install the threaded end 26 of the valve body 12 to the threaded opening in the engine sump or crankcase. Once the valve body 12 of the drain valve 10 is installed, no tools are required to drain the fluid from the engine sump or crankcase, as described below. The valve body 12 further includes an annular ramp 21 that extends outwardly from the exterior of the valve body 12 and that serves as an inclined surface for the valve sleeve 16 to aid in aligning and properly positioning the valve sleeve 16 onto the valve body 12.

Figure 3:
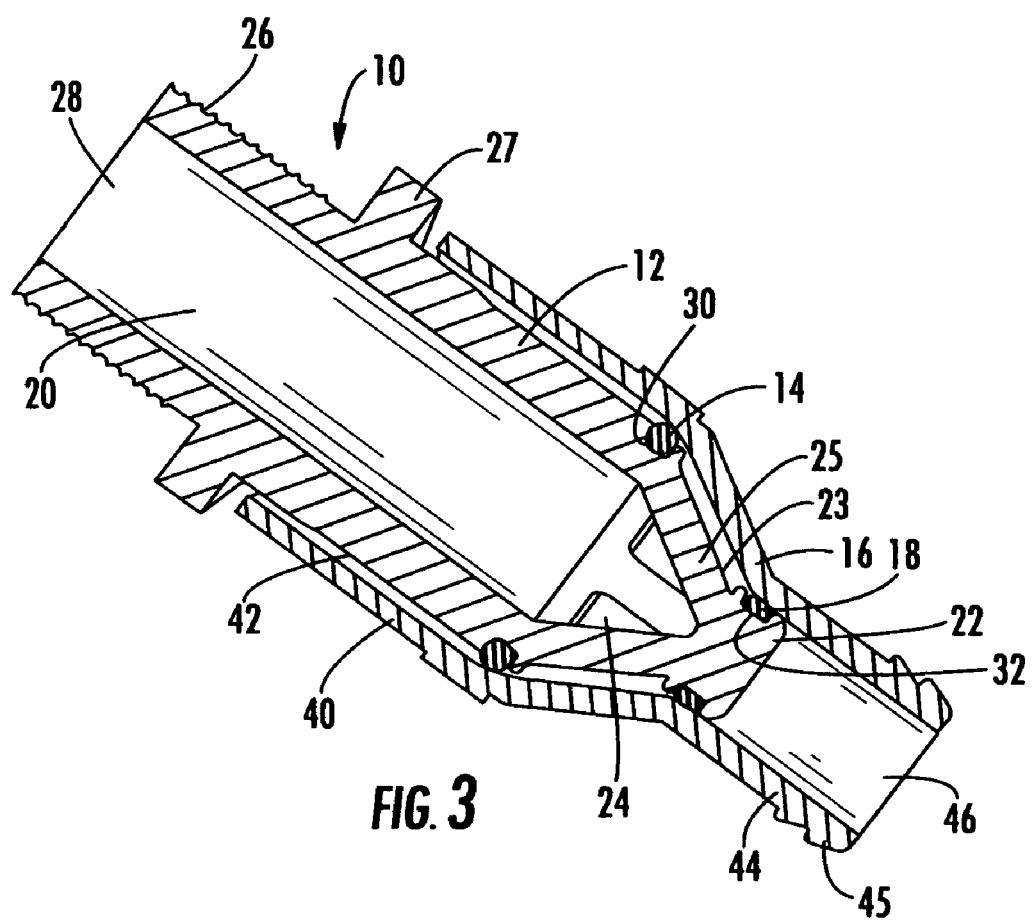
FIG. 3 is a cut-away view of the drain valve of FIG. 1, illustrating the drain valve in a closed valve position.

As illustrated in FIGS. 1 and 3, the first end 22 of the valve body 12 defines a nose 23 of the valve body and forms the plurality of openings or windows 24. The openings or windows are separated from each other by a plurality of support ribs 25 that connect the end 22 to the main body portion of the valve body 12. The shape of the nose 23 and the plurality of support ribs 25 give the first end 22 a truncated conical shape. The number and spacing of openings 24 and ribs 25 may vary. In the illustrated embodiment, four openings or windows 24 are formed by four support ribs 25 spaced equidistant around the central axis of the valve body 12. Depending on the application, it may be desirable to increase the fluid flow out of the valve. In those circumstances, it may be desirable to reduce the number of support ribs 25 to thereby increase the size of the openings 24 and thus increase the fluid flow rate. Similarly, it may be desirable to decrease the fluid flow rate, in which case, the size of the openings 24 may be reduced by increasing the number and/or size of the support ribs 25. As discussed in detail below, when the valve sleeve 16 is manipulated to the open valve position, the fluid to be drained from the engine sump or crankcase will flow through the passageway 20 and out the plurality of openings or windows 24.

Figure 4:
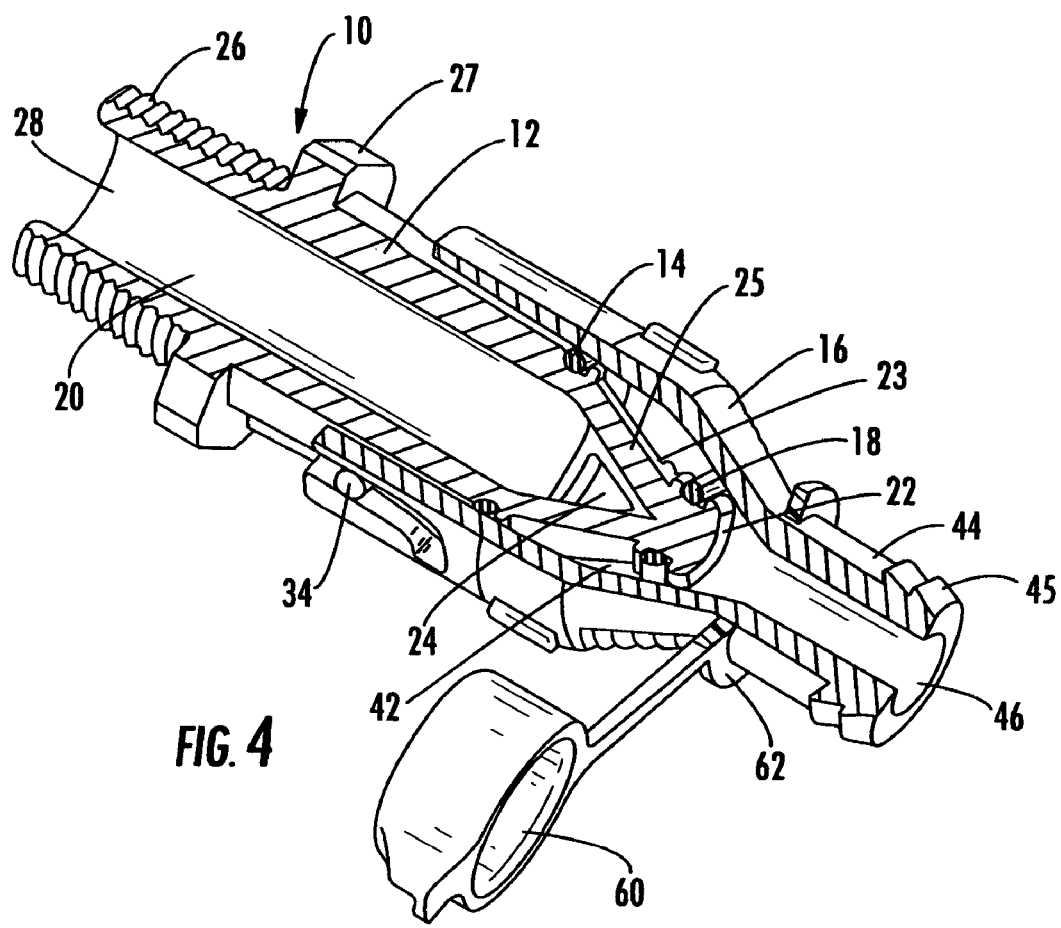
FIG. 4 is a cut-away isometric view of the drain valve of FIG. 2, illustrating the drain valve in an open valve position.
Figure 7:
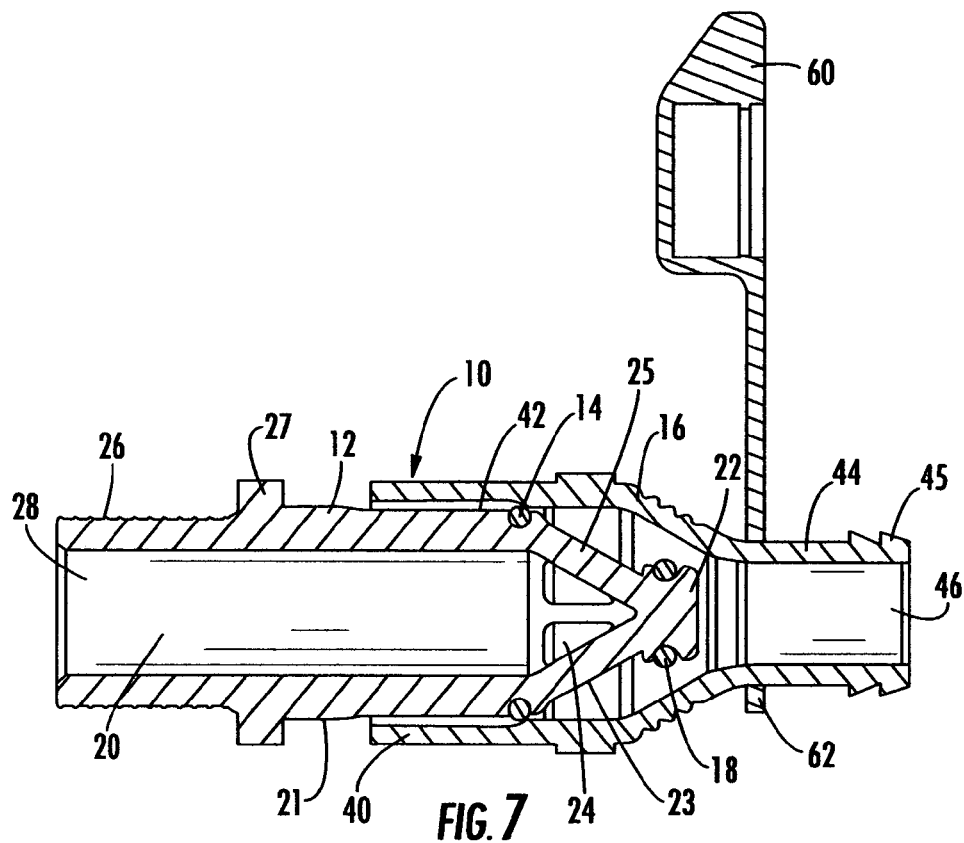
FIG. 7 is a cross-section view of the drain valve of FIG. 8 taken at line 7-7 and illustrating the drain valve in an open valve position, with an attached cap.

As depicted in FIG. 3, the first o-ring 14 is positioned in a groove 30 and located on one side of the plurality of openings or windows 24. The o-ring 14 creates a seal between the exterior of the valve body 12 and the interior of the valve sleeve 16. The second o-ring 18 is positioned in a groove 32 and located on the opposite side of the plurality of openings or windows 24 adjacent to the nose 23. As illustrated by FIG. 3, the second o-ring 18 creates a seal between the exterior of the valve body 12 and the interior of the valve sleeve 16, when the valve 10 is in the closed valve position. As illustrated by FIGS. 4 and 7, when the valve sleeve 16 is manipulated to the open valve position, the second o-ring 18 no longer creates a seal between the valve body 12 and the valve sleeve 16. In this position, fluid is permitted to exit through the plurality of openings or windows 24, through the valve sleeve 16, and out an opening 46 in the valve sleeve 16. As depicted in the Figures, the second o-ring 18 defines a diameter that is less than the diameter of the first o-ring 14. A standard rubber o-ring may be used as the first and second o-rings 14, 18.

Referring to FIG. 1, the valve body 12 includes at least one pin 34, and preferably two pins, that extend outwardly from the valve body 12. Each pin 34 is configured to engage with a mating slot 36 formed in the valve sleeve 16. The illustrated pin and slot configuration provides a valve 10 that requires a twist and pull action to open the valve, thus reducing the risk of accidental opening of the valve. The illustrated configuration also prevents the valve sleeve 16 from sliding off the valve body 12, as discussed below. Other shaped pin and slot configurations may be used to provide the additional manipulation of the valve sleeve 16 to open and close the valve, and to prevent the valve sleeve 16 from sliding off the valve body 12. The valve body 12 may be made of zinc die cast, rigid plastic, or other suitable material.

Referring to FIGS. 1-4, the valve sleeve 16 is configured to fit over the valve body 12. The valve sleeve 16 defines a generally cylindrical valve sleeve body 40, an interior cylindrical passageway 42 and a hose connect 44. The hose connect 44 defines hose connect elements 45 configured on the exterior of the hose connect 44 for connection with a drain hose, or the like, not shown. The hose connect 44 also defines an opening 46 through which fluid to be drained from the engine sump or crankcase may flow. As illustrated, the opening 46 is configured with a diameter that is less than the diameter of the cylindrical passageway 42. The interior cylindrical passageway 42 is shaped and configured to match the exterior shape and configuration of the valve body 12.

The valve sleeve body 40 further includes at least one arcuate-shaped slot 36 that, in operation, mates with the at least one pin 34 and guides the pin 34 along the slot 36. The slot 36 at its end defines a pair of opposing detents 48 that extend toward each other and into the slot 36. In use, the detents 48 serve to retain the valve sleeve 16 onto the valve body 12 when the valve sleeve 16 is pulled to the open valve position, thereby preventing the valve sleeve 16 from sliding off the valve body 12. Located on the exterior of the valve sleeve body 40 are a plurality of gripping elements 50 that serve as a gripping surface for a user to manipulate the valve sleeve 16 from a closed valve position to an open valve position and vice versa. The valve sleeve 16 may be molded from a plastic material, or any other suitable material.

Figure 2:
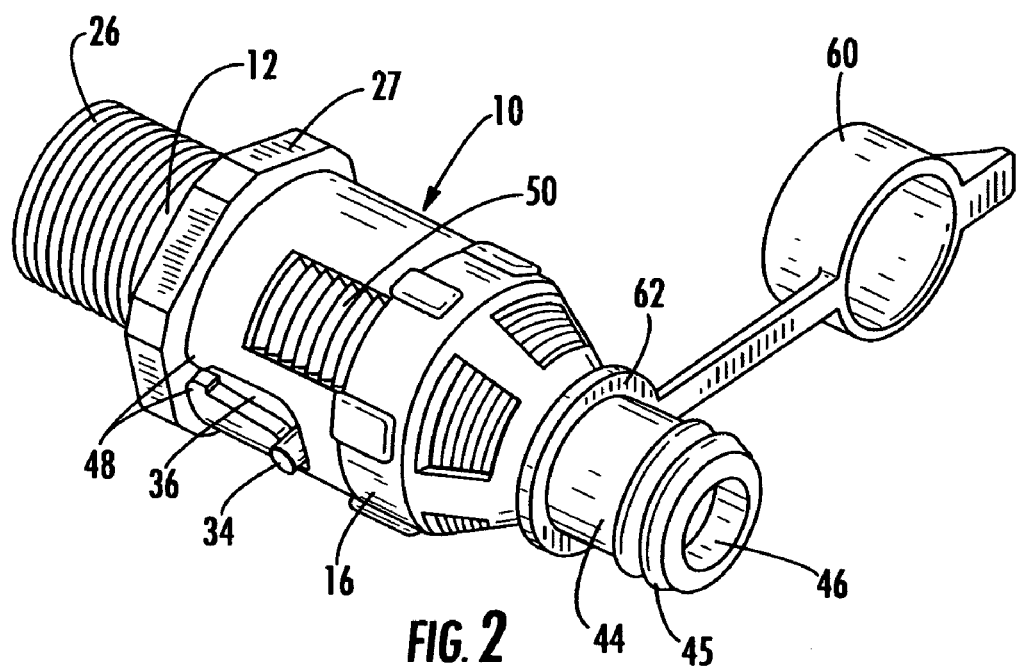
FIG. 2 is an assembled isometric view of the drain valve of FIG. 1, with an attached cap.

Referring to FIGS. 2, 4 and 7, a cap 60 may be positioned over the hose connect 44 portion of the valve sleeve 16 to cover the opening 46 from ambient conditions and prevent dirt, moisture and other items from entering the opening 46. The cap 60 may be snap fit over the hose connect 44 or may be attached to the hose connect 44 through other known techniques. The cap 60 may include an attachment ring 62 that is positioned around the hose connect 44 to retain the cap 60 onto the valve sleeve 16 and thereby prevent the cap 60 from being lost or misplaced.

Figure 8:
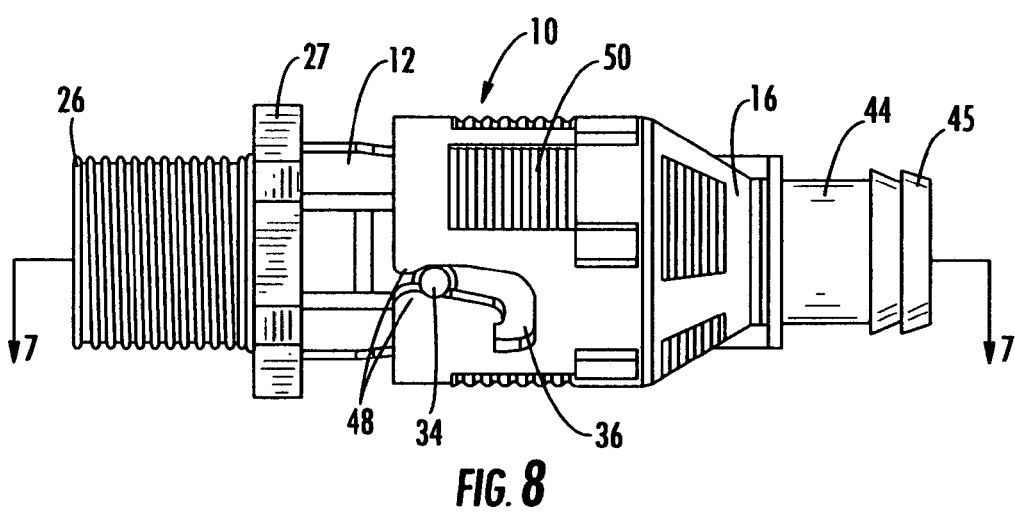
FIG. 8 is a side view of the drain valve of the invention, illustrating the drain valve in an open valve position.
Figure 9:
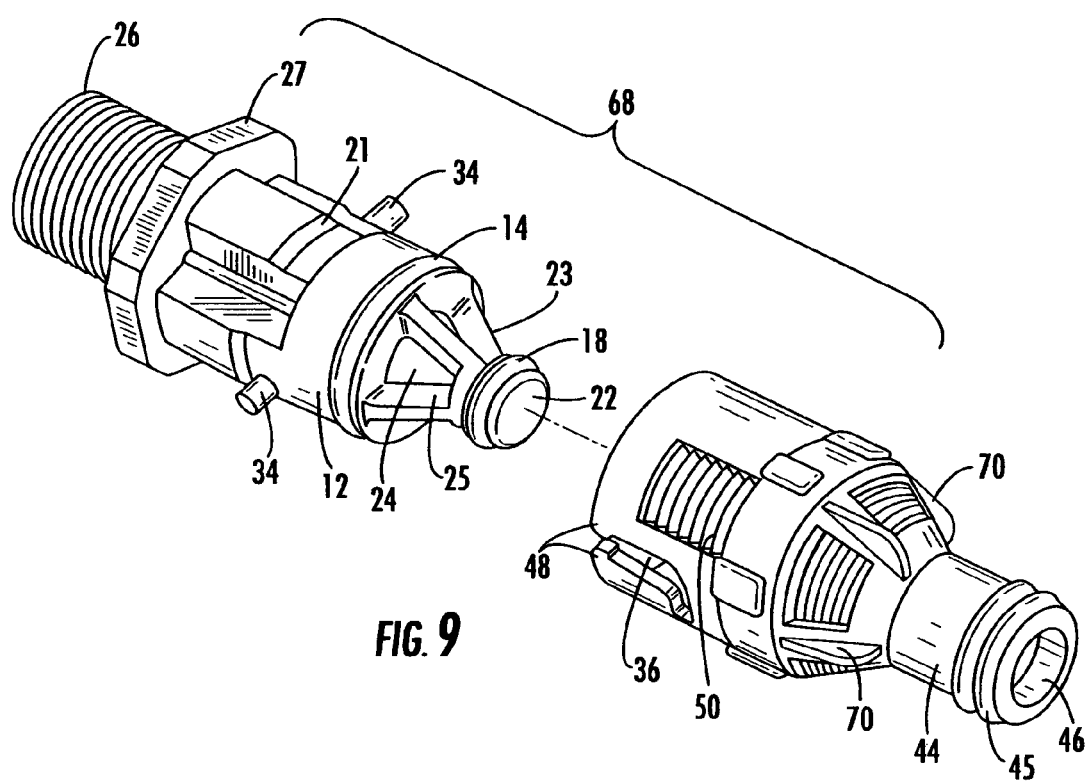
FIG. 9 is an isometric view of another embodiment of the drain valve of the invention.
Figure 10:
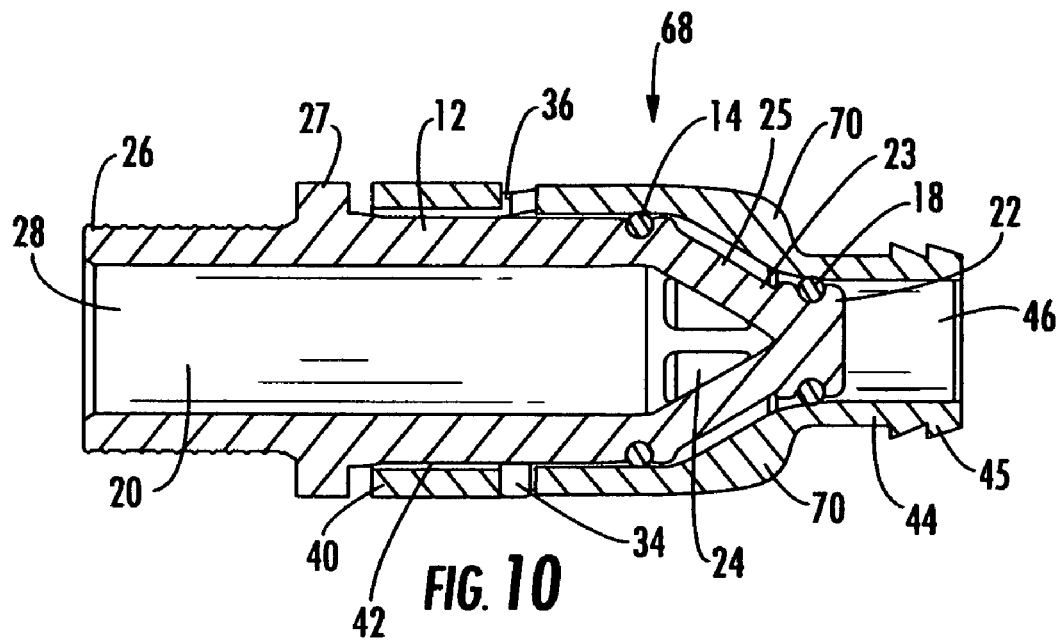
FIG. 10 is a cross-section view of the drain valve of FIG. 11 taken at line 10-10 and illustrating the drain valve in a closed valve position.
Figure 11:
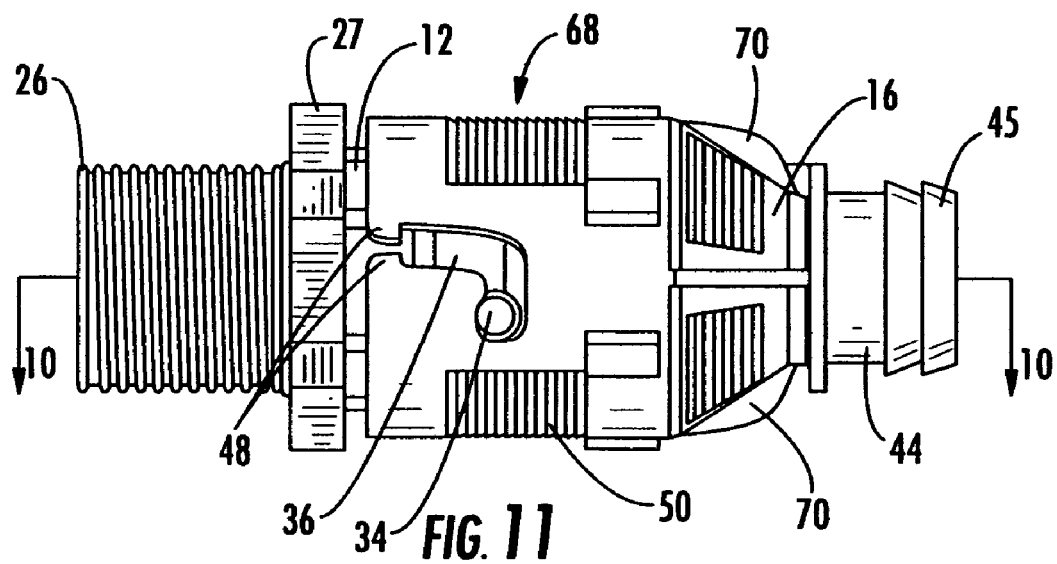
FIG. 11 is a side view of the drain valve of the invention, illustrating the drain valve in a closed valve position.

With the embodiment described above, when the valve sleeve 16 is twisted and pulled, the valve 10 is moved to an open valve position, as shown in FIGS. 4, 7 and 8, whereby the fluid from the engine will drain from the engine by flowing through the passageway 20 and openings 24 and out the hose connect opening 46. Fluid is permitted to flow through the valve because the second o-ring 18 on the valve body 12 is disengaged from the interior of the valve sleeve 16, thus breaking the seal between the valve body 12 and the valve sleeve 16. Once in this position, the fluid is no longer hindered from flowing out the hose connect opening 46 of the valve sleeve 16. As shown in the Figures, the first o-ring 14 on the valve body 12 remains in a sealing contact with the valve sleeve 16 to prevent fluid from exiting back out between the valve body 12 and the valve sleeve 16, thereby forcing the fluid to exit at the hose connect opening 46.

The valve 10 is closed by reversing the motion. That is, the user first pushes the valve sleeve 16 and then twists the valve sleeve 16 to force the second o-ring 18 to seal against the inside of the valve sleeve 16, thereby preventing fluid from passing out the opening 46.

Figure 12:
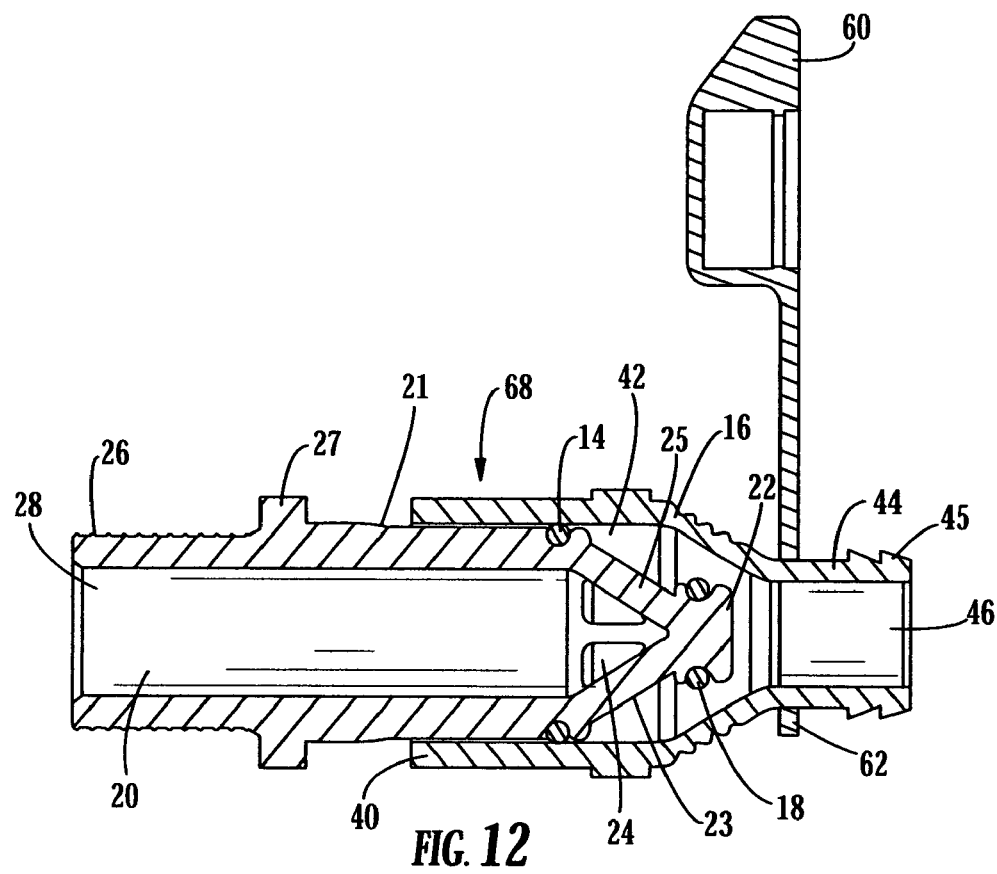
FIG. 12 is a cross-section view of the drain valve of FIG. 13 taken at line 12-12 and illustrating the drain valve in an open valve position, with an attached cap.
Figure 13:
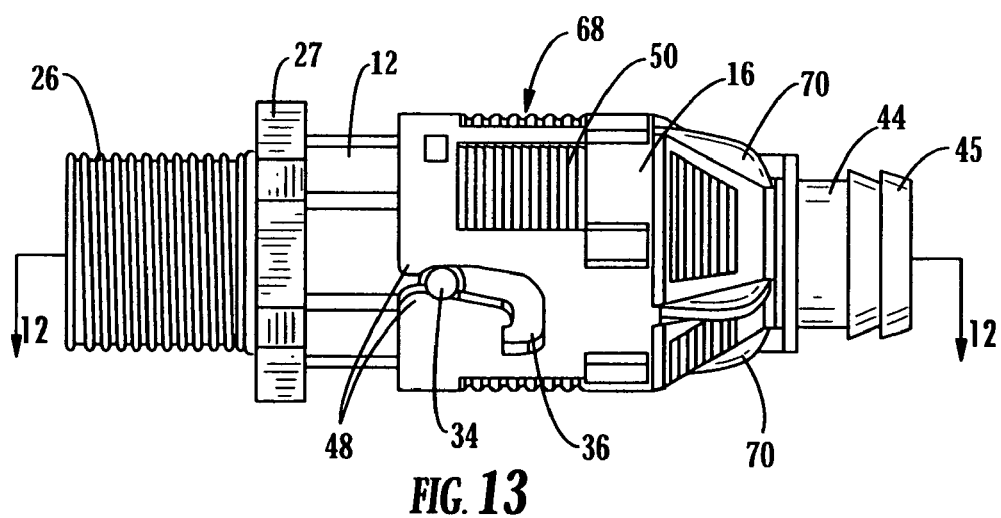
FIG. 13 is a side view of the drain valve of the invention, illustrating the drain valve in an open valve position.
Figure 14:
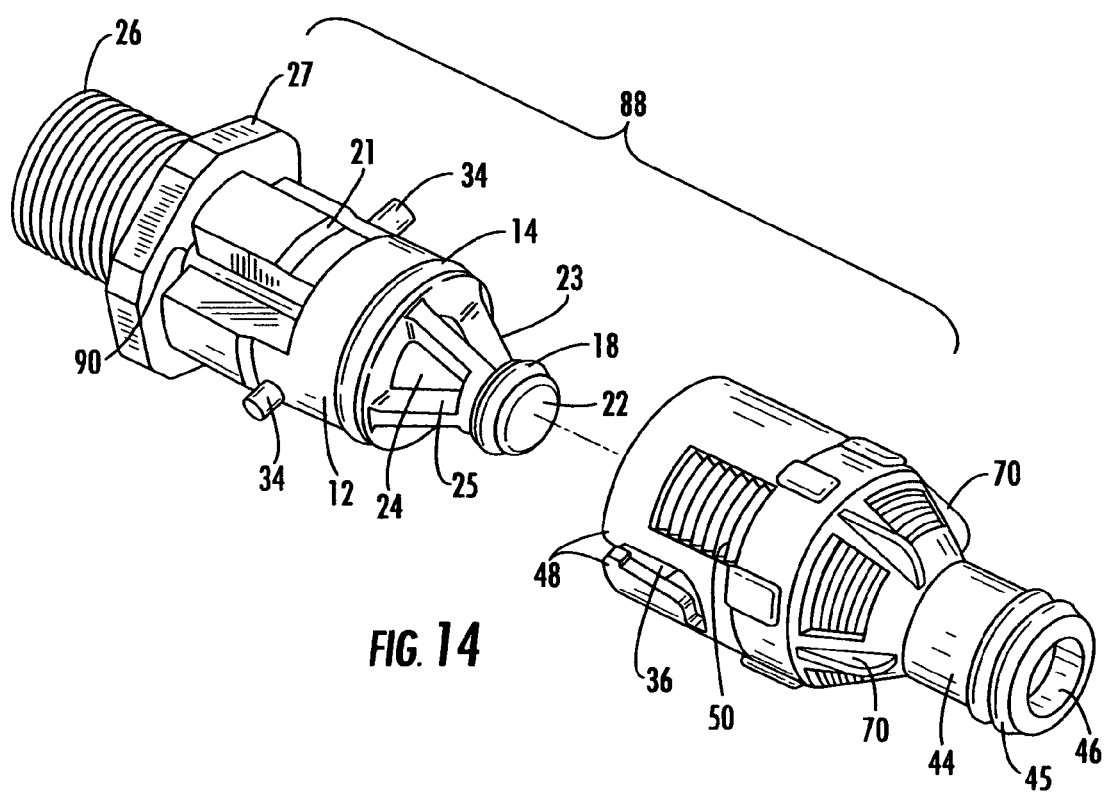
FIG. 14 is an isometric view of yet another embodiment of the drain valve of the invention.

Referring to FIGS. 9-13, there is depicted another embodiment of the drain valve. In this embodiment, a drain valve 68 includes a plurality of tabs 70 that may be added to the exterior of the valve sleeve 16 to assist the user with the manipulation of the valve sleeve 16 to open and close the valve. The plurality of tabs 70 may be positioned in an equidistant manner around the valve sleeve 16 to serve as additional gripping elements to facilitate the turning of the valve sleeve 16. The plurality of tabs 70 may define other tab shapes and configurations that enhance the user's manipulation of the valve sleeve 16. As with the above described embodiment, when the valve sleeve 16 is twisted and pulled to an open valve position, as illustrated in FIGS. 12 and 13, the second o-ring 18 on the valve body 12 is disengaged from the interior of the valve sleeve 16, thus breaking the seal between the valve body 12 and the valve sleeve 16. In this position, fluid from the engine will drain from the engine through the passageway 20, out the plurality of openings 24 and the hose connect opening 46. Similarly, when the valve sleeve 16 is pushed and twisted to the closed valve position, the second o-ring 18 will seal against the inside of the valve sleeve 16, thereby preventing fluid to flow out through the hose connect opening 46. The remaining features of the valve body 12 and valve sleeve 16 are similar to the features of the embodiment described above and illustrated in FIGS. 1-8 and therefore will not be repeated here.

Referring to FIGS. 14-18, there is depicted yet another embodiment of the drain valve. Drain valve 88 is similar to the embodiment depicted in FIGS. 9-13 and common features have been identified by common numerals. The drain valve 88 includes a notch 90 formed in the valve body 12. In an exemplary embodiment, the notch 90 is positioned adjacent to or in close proximity to the head 27 or valve removal member and circumscribes the valve body 12. The notch 90 results in the valve body 12 having a wall thickness at this location that is less than the wall thickness of the remainder of the valve body. The notch 90 serves as a break point, and under specific conditions, will permit the valve 88 to break at that location on the valve 88.

This embodiment will provide benefits under certain conditions. For example, in applications where the drain valve is mounted to an engine block, and in the situation where the engine block is accidentally dropped on the valve 88 or in the situation where the valve is bumped or hit by another object, it is desirable for the valve 88 to break at the notch 90, as opposed to the engine block cracking. Under these conditions, it is more economical and beneficial to repair or replace the drain valve 88 instead of the more costly engine block. After the valve 88 breaks at notch 90, the remaining portion of the valve body 12 threaded into the engine block may be removed by unscrewing the head 27. Upon the removal of the remaining portion from the engine, a replacement valve may be threaded back into the engine.

The notch 90 may define numerous other configurations that still permit the valve 88 to break at that location or other locations on the valve body. For example, the notch 90 may be a continuous groove that extends around the valve body 12 or may be a plurality of groove segments spaced apart around the valve body 12. Alternatively, the notch 90 may be a necked-down region, or a reduced wall thickness region, of the valve body 12 where the wall thickness at this location is less than the wall thickness of the other regions of the valve body. One skilled in the art will appreciate that yet other alternative configurations are possible to permit the valve to break under the conditions described above.

Figure 15:
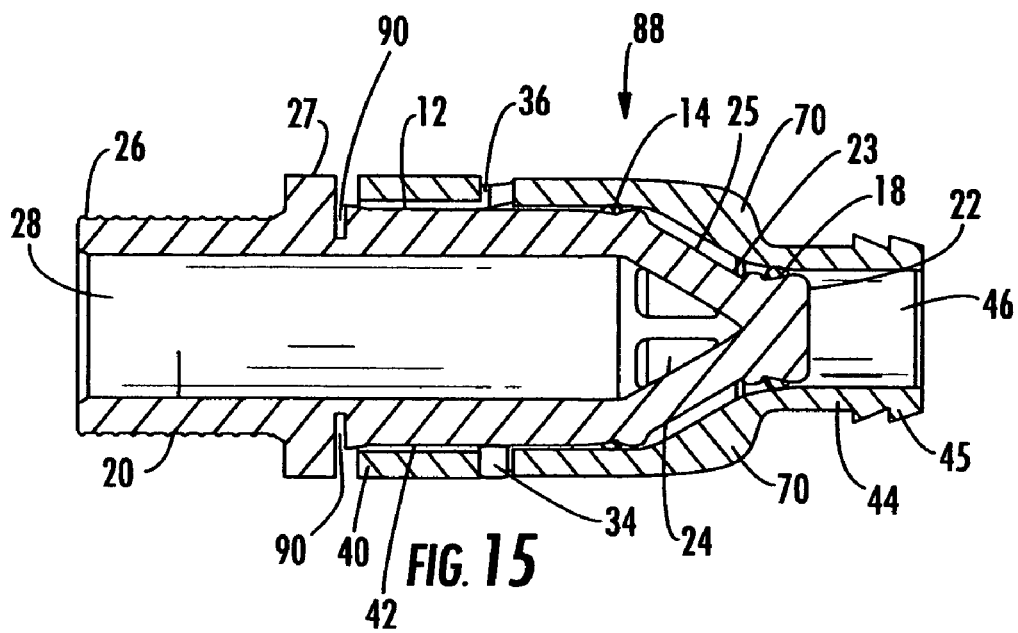
FIG. 15 is a cross-section view of the drain valve of FIG. 16 taken at line 15-15 and illustrating the drain valve in a closed valve position.
Figure 16:
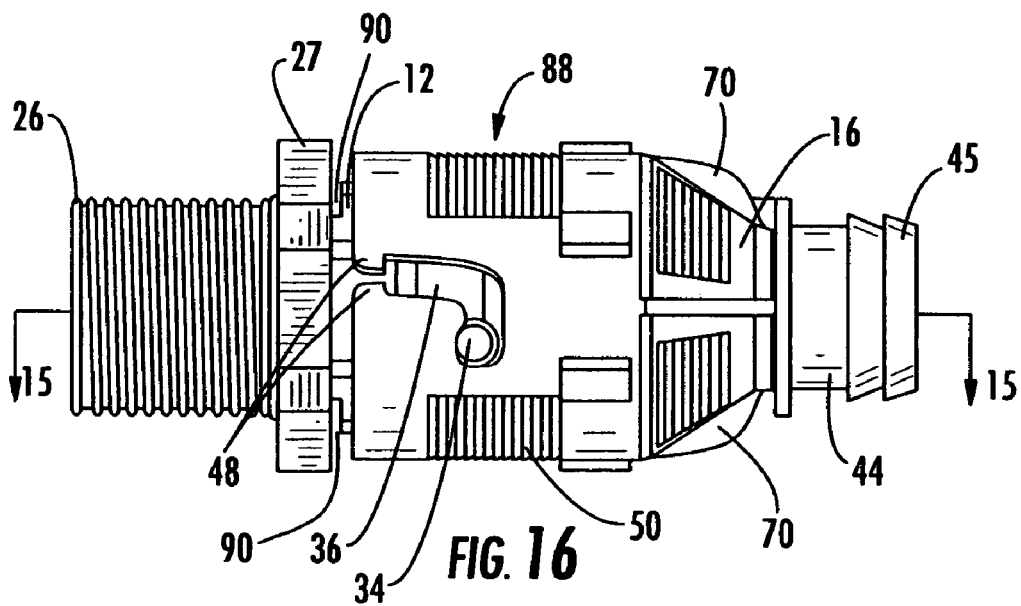
FIG. 16 is a side view of the drain valve of the invention, illustrating the drain valve in a closed valve position.
Figure 17:
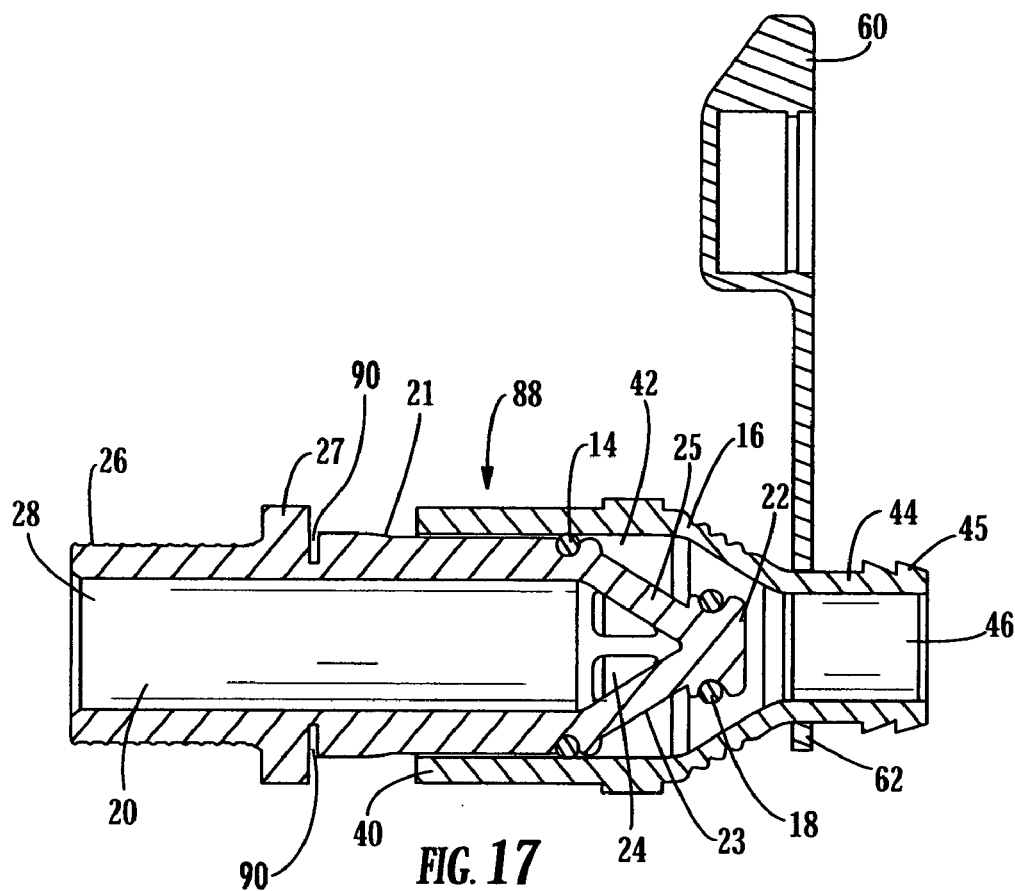
FIG. 17 is a cross-section view of the drain valve of FIG. 18 taken at line 17-17 and illustrating the drain valve in an open valve position, with an attached cap.
Figure 18:
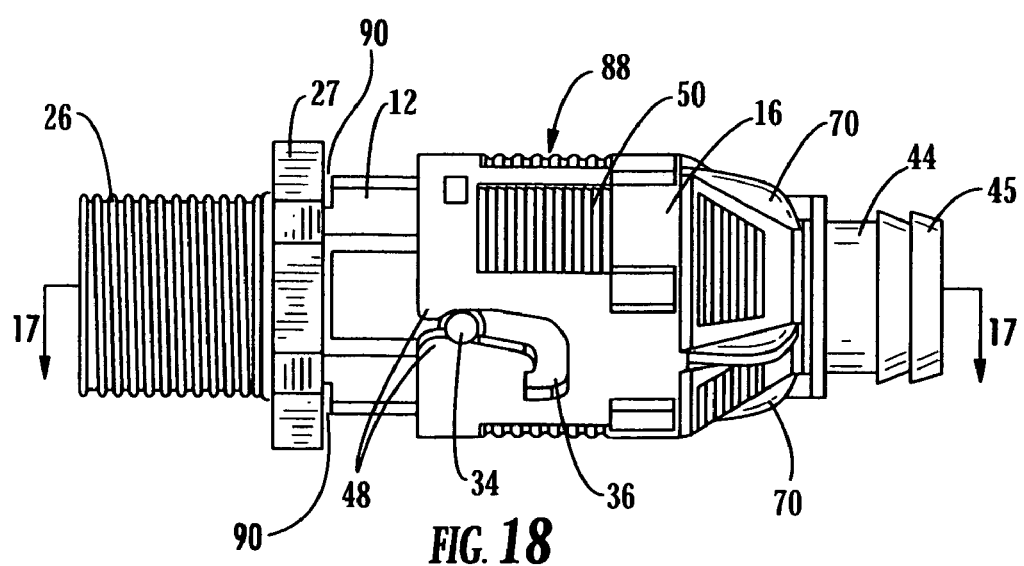
FIG. 18 is a side view of the drain valve of the invention, illustrating the drain valve in an open valve position.

Referring to FIGS. 15-18, and similar to the embodiment described in FIGS. 9-13, the valve sleeve 16 of the valve 88 may be manipulated by a user vis-à-vis the plurality of tabs 70 to open and close the valve. When the valve sleeve 16 is twisted and pulled to an open valve position, as illustrated in FIGS. 17 and 18, the second o-ring 18 on the valve body 12 is disengaged from the interior of the valve sleeve 16, thus breaking the seal between the valve body 12 and the valve sleeve 16. As above, in this position, fluid from the engine will drain from the engine through the passageway 20, out the plurality of openings 24 and the hose connect opening 46. Referring to FIGS. 15 and 16, when the valve sleeve 16 is pushed and twisted to the closed valve position, the second o-ring 18 will seal against the inside of the valve sleeve 16, thereby preventing fluid to flow out through the hose connect opening 46. Returning to FIG. 17, similar to the other embodiments, a cap 60 may be positioned over the hose connect 44 portion of the valve sleeve 16 to cover the opening 46 and prevent dirt, moisture and other items from entering the opening 46. The remaining features of the valve body 12 and valve sleeve 16 are common to the features of the embodiment described above and also illustrated in FIGS. 1-8.

Advantageously, with the embodiments described above and illustrated in the Figures, no tool is required to operate the valve sleeve 16 and thereby open the valve 10 to drain the fluid. In addition, because the valve sleeve 16 is retained by the valve body 12, the valve sleeve cannot be inadvertently lost or misplaced. As illustrated, the valve sleeve may include different types of gripping elements and tabs to facilitate the opening and closing of the valve. Also, with the invention, it is no longer necessary to reinstall the drain valve after the initial installation and thus the problems associated with cross-threading, thread stripping, and resulting leakage are avoided.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fluid drain valve comprising:
   a valve body defining a first threaded end, a second end, a first passageway extending through the valve body from the first end to the second end, an annular ramp disposed on the exterior of the valve body, and a notch formed on the valve body, the valve body further defining at least one opening at the second end,
   a first o-ring mounted on one side of the at least one opening,
   a second o-ring mounted on the opposite side of the at least one opening, and
   a valve sleeve mounted to the valve body and over the at least one opening, the valve sleeve defining a second passageway and a sleeve opening,
   the annular ramp defining an inclined surface to aid in aligning the valve sleeve on the valve body,
   whereby when the valve sleeve is manipulated, the valve sleeve is partially removed from the valve body and fluid may flow through the at least one opening in the valve body and out the sleeve opening.

2. The fluid drain valve of claim 1 wherein the valve body further includes a head configured on the valve body between the first threaded end and the second end.

3. The fluid drain valve of claim 2 wherein the notch on the valve body is positioned adjacent to the head.

4. The fluid drain valve of claim 3 wherein the valve body defines a first wall thickness, and a second wall thickness at the location of the notch, and wherein the second wall thickness is less than the first wall thickness.

5. The fluid drain valve of claim 4 wherein the notch circumscribes the valve body.

6. The fluid drain valve of claim 1 wherein the valve body further includes at least one pin extending outward from the valve body.

7. The fluid drain valve of claim 6 wherein the valve sleeve further includes at least one slot that mates with the at least one pin.

8. The fluid drain valve of claim 7 wherein the at least one slot further defines opposing detents that retain the valve sleeve onto the valve body.

9. A fluid drain valve comprising:
- a valve body defining a first threaded end, a second end, a first passageway extending through the valve body from the first end to the second end, and a notch formed on the valve body, the valve body further defining a plurality of openings at the second end formed by a plurality of support ribs,
- a first o-ring mounted on one side of the plurality of openings,
- a second o-ring mounted on the opposite side of the plurality of openings,
- a valve sleeve mounted to the valve body and over the plurality of openings, the valve sleeve defining a second passageway and a sleeve opening, and
- a cap removably positioned over the valve sleeve opening, wherein the cap further defines an attachment ring to retain the cap on the valve sleeve when the cap is removed from the sleeve opening,
- whereby when the valve sleeve is manipulated, fluid may flow through the plurality of openings in the valve body and out the sleeve opening.

10. The fluid drain valve of claim 9 wherein the second end of valve body defines a nose, and wherein the second o-ring is positioned adjacent to the nose.

11. The fluid drain valve of claim 9 wherein the valve body further includes a head configured on the valve body and wherein the notch on the valve body is positioned in close proximity to the head.

12. The fluid drain valve of claim 9 wherein the valve sleeve opening defines a first diameter and the second passageway defines a second diameter, and wherein the first diameter is less than the second diameter.

13. The fluid drain valve of claim 9 wherein the valve body further includes at least one pin extending outward from the valve body, and wherein the valve sleeve further includes at least one arcuate shaped slot that mates with the at least one pin.

14. The fluid drain valve of claim 9 wherein the notch circumscribes the valve body.

15. The fluid drain valve of claim 9 wherein the valve sleeve defines an open valve position and a closed valve position, and wherein the second o-ring permits fluid to pass through the sleeve opening when the valve sleeve is in the open valve position, and prevents fluid from passing through the sleeve opening when the valve sleeve is in the closed valve position.

16. The fluid drain valve of claim 15 wherein the first o-ring prevents fluid from passing between the valve sleeve and the valve body when the valve sleeve is in either the open valve position or the closed valve position.

17. A fluid drain valve comprising:
- a valve body defining a cylindrical shaped body having a first threaded end, a conical shaped second end, and a first passageway extending through the valve body from the first end to the second end, the valve body further defining a plurality of openings at the second end and a reduced wall thickness region, the valve body further including at least one pin extending outward from the valve body,
- an o-ring mounted at the second end of the valve body, and
- a valve sleeve mounted to the valve body and over the plurality of openings, the valve sleeve defining a second passageway and at least one arcuate shaped slot that mates with the at least one pin,
- whereby the valve sleeve defines an open valve position and a closed valve position, and wherein the o-ring permits fluid to pass through the second passageway when the valve sleeve is in the open valve position, and prevents fluid from passing through the second passageway when the valve sleeve is in the closed valve position.

18. The fluid drain valve of claim 17 wherein the valve sleeve defines a sleeve opening having a first diameter, wherein the second passageway defines a second diameter, and wherein the first diameter is less than the second diameter.

19. The fluid drain valve of claim 17 wherein the reduced wall thickness region is formed by a notch that circumscribes the valve body.

20. The fluid drain valve of claim 17 wherein the valve body further includes a valve removal member configured on the valve body and wherein the reduced wall thickness region is configured in close proximity to the valve removal member.

* * * * *